US012731783B2

(12) United States Patent
Chen et al.

(10) Patent No.: US 12,731,783 B2
(45) Date of Patent: Sep. 8, 2026

(54) NEGATIVE ELECTRODE MATERIAL, NEGATIVE ELECTRODE PLATE, AND ELECTROCHEMICAL APPARATUS AND ELECTRONIC APPARATUS CONTAINING SUCH NEGATIVE ELECTRODE PLATE

(71) Applicant: Ningde Amperex Technology Limited, Ningde (CN)

(72) Inventors: Zhihuan Chen, Ningde (CN); Daoyi Jiang, Ningde (CN)

(73) Assignee: Ningde Amperex Technology Limited, Ningde (CN)

(*) Notice: Subject to any disclaimer, the term of this patent is extended or adjusted under 35 U.S.C. 154(b) by 577 days.

(21) Appl. No.: 18/342,039

(22) Filed: Jun. 27, 2023

(65) Prior Publication Data

US 2023/0343943 A1 Oct. 26, 2023

Related U.S. Application Data

(63) Continuation of application No. PCT/CN2020/140377, filed on Dec. 28, 2020.

(51) Int. Cl.

*H01M 4/38* (2006.01)
*C01B 33/18* (2006.01)
*H01M 4/02* (2006.01)
*H01M 4/134* (2010.01)
*H01M 4/62* (2006.01)
*H01M 10/0525* (2010.01)

(52) U.S. Cl.

CPC ............. *H01M 4/386* (2013.01); *C01B 33/18* (2013.01); *H01M 4/134* (2013.01); *H01M 4/622* (2013.01); *H01M 4/625* (2013.01); *H01M 10/0525* (2013.01); *C01P 2002/60* (2013.01); *C01P 2004/61* (2013.01); *C01P 2004/62* (2013.01); *C01P 2004/80* (2013.01); *C01P 2006/40* (2013.01); *H01M 2004/021* (2013.01); *H01M 2004/027* (2013.01)

(58) Field of Classification Search

CPC ...... H01M 4/386; H01M 4/134; H01M 4/622; H01M 4/625; H01M 2004/021; H01M 2004/027; C01P 2004/61; C01P 2004/62; C01P 2004/80; C01P 2006/40

See application file for complete search history.

(56) References Cited

U.S. PATENT DOCUMENTS

2017/0047584 A1 2/2017 Hwang et al.
2017/0288211 A1* 10/2017 Zhamu .................. H01M 4/386
2018/0212247 A1* 7/2018 Zhamu ................ H01M 4/0497
2018/0241032 A1* 8/2018 Pan ....................... H01M 4/625
2019/0207209 A1* 7/2019 Venkatachalam ..... H01M 4/133
2019/0207221 A1* 7/2019 Son ..................... H01M 4/1395
2019/0273249 A1* 9/2019 Zhamu .................. H01M 4/131
2019/0273250 A1* 9/2019 Zhamu ................ H01M 4/1395
2020/0144597 A1* 5/2020 Ha ........................ H01M 4/622
2020/0185704 A1* 6/2020 Zhamu ..................... H01B 1/04
2020/0358088 A1* 11/2020 Lin ....................... H01M 4/625
2021/0135209 A1* 5/2021 Hayner ................. H01M 4/587
2021/0359292 A1* 11/2021 Lu ....................... H01M 10/052
2022/0020997 A1* 1/2022 Lau ....................... H01M 4/623
2023/0242402 A1* 8/2023 Morita .................. H01M 4/625
423/445 R

FOREIGN PATENT DOCUMENTS

CN 107134567 A 9/2017
CN 107946561 A 4/2018
CN 107946570 A 4/2018
CN 108075117 A 5/2018
CN 109841823 A 6/2019
CN 109994717 A 7/2019
CN 110690433 A 1/2020
CN 110797520 A 2/2020
JP 2019119669 A 7/2019
KR 101627318 B1 6/2016
WO WO-2015170918 A1 * 11/2015 ............ C01B 32/05
WO 2020184157 A1 9/2020
WO 2020184938 A1 9/2020

OTHER PUBLICATIONS

Machine Translation of WO-2015170918-A1 (Jan. 9, 2026) (Year: 2026).*
International Search Report issued on Sep. 29, 2021, in corresponding International Application No. PCT/CN2020/140377, 6 pages.
Office Action issued on May 18, 2022, in corresponding Chinese Application No. 202080031407.4, 18 pages.
Office Action issued on Sep. 30, 2022, in corresponding Chinese Application No. 202080031407.4, 16 pages.
Office Action issued on Aug. 6, 2024, in corresponding Japanese Application No. 2023-538983, 8 pages.
Office Action issued on Mar. 4, 2025, in corresponding Japanese Application No. 2023-538983, 6 pages.
Office Action issued on Aug. 28, 2024, in corresponding Indian Application No. 202327048356, 6 pages.

* cited by examiner

*Primary Examiner* — Matthew J Merkling
(74) *Attorney, Agent, or Firm* — Maier & Maier, PLLC

(57) ABSTRACT

A negative electrode material including a silicon compound $SiO_x$, a first conductive layer, and a second conductive layer; where $0.5 \le x \le 1.5$; at least part of the first conductive layer is present between the silicon compound and the second conductive layer; and the first conductive layer includes graphene, and the second conductive layer includes carbon nanotubes. This application further provides a negative electrode material different from the above negative electrode material in that the first conductive layer includes carbon nanotubes and the second conductive layer includes graphene. An electrochemical apparatus having the negative electrode material combines the advantages of graphene and carbon nanotubes, to obtain long cycle life and low swelling rate.

19 Claims, No Drawings

NEGATIVE ELECTRODE MATERIAL, NEGATIVE ELECTRODE PLATE, AND ELECTROCHEMICAL APPARATUS AND ELECTRONIC APPARATUS CONTAINING SUCH NEGATIVE ELECTRODE PLATE

CROSS REFERENCES TO RELATED APPLICATIONS

This application is a continuation application of PCT/CN2020/140377, filed on Dec. 28, 2020, the disclosure of which is hereby incorporated by reference in its entirety.

TECHNICAL FIELD

This application pertains to the field of battery technologies, in particular, relates to the field of lithium-ion battery technologies, and specifically, to two negative electrode materials, a negative electrode plate coated with such negative electrode material, and an electrochemical apparatus and electronic apparatus containing such negative electrode plate.

BACKGROUND

An important aspect of technological innovation in batteries, and in particular in lithium-ion batteries, is to continuously improve the energy density. At present, the actual capacity of mainstream graphite materials is close to the theoretical capacity (372 mAh/g), and there is already a bottleneck in improving the energy density. Silicon-based negative electrode materials have attracted much attention and research because of their advantages such as abundant reserves, ultra-high theoretical capacity (4200 mAh/g), and environmental friendliness. However, the volume swelling (more than 300%) of the silicon-based negative electrode materials during cycling has seriously affected the process of industrial application of the silicon-based negative electrode materials.

Main methods to solve problems such as rapid attenuation of cycling (capacity retention rate after 400 cycles is lower than 80%) due to large volume swelling (120%-300%) and poor electrical conductivity (≤1 S/m) of silicon materials during cycling are as follows. (1) Nanosize silicon materials. The volume change of nano-silicon materials during cycling is small (<300%). Compared with non-nano materials (particle size >1 μm), nano materials are not easily broken and pulverized after swelling, which is conducive to maintaining the structural stability of the materials. (2) Perform surface coating and modification for silicon negative electrode materials, especially carbon coating. This can increase the conductivity of materials (the conductivity of materials after carbon coating is greater than 100 S/m) and alleviate the swelling (<80%). (3) Mix silicon-containing materials with graphite or other materials (metals or non-metals). Excellent electrical conductivity and extensibility of graphite and other materials can significantly alleviate the volume swelling of silicon materials during cycling and increase the electrical conductivity of the system. (4) Optimize a binder for a silicon negative electrode, to enhance adhesion of the silicon-containing negative electrode and restrain the swelling of silicon materials.

However, the above methods have the following defects and problems: Nano materials of a large specific surface area (materials with particle size less than 100 nm can have a specific surface area as high as 100 $m^2/g$) consume more electrolyte to form SEI films, resulting in a low initial coulombic efficiency. Moreover, the nano materials feature difficult preparation and high price, and these series of characteristics limit further application of the nano silicon materials. Existing CVD alkyne gas coating and solid-phase pitch coating cannot improve the electrical conductivity significantly, and the problem of electrical contact failure caused by swelling during cycling cannot be solved. Simple mechanical mixing of the silicon-based negative electrode with graphite of good electrical conductivity cannot guarantee the uniformity of mixing, and to ensure the contact between graphite and silicon-based particles during the cycling, a binder with high adhesion is required, and this will result in a decrease in rate performance.

SUMMARY

In view of the foregoing problems in the prior art, one of the objectives of this application is to provide two types of silicon-containing negative electrode materials with better electrical conductivity and more suitable for electrochemical apparatuses, especially for lithium-ion batteries. In this application, composition and outer surface layer of silicon-containing negative electrode materials are taken into account, and two types of silicon-containing negative electrode materials with long cycle life and low swelling rate are obtained.

Another objective of this application is to further provide a negative electrode plate including the foregoing negative electrode materials, and an electrochemical apparatus and electronic apparatus containing such negative electrode plate.

In view of this, this application provides a negative electrode material including a silicon compound $SiO_x$, a first conductive layer, and a second conductive layer; where $0.5 \leq x \leq 1.5$; at least part of the first conductive layer is present between the silicon compound and the second conductive layer; and the first conductive layer includes graphene, and the second conductive layer includes carbon nanotubes.

In view of this, this application further provides a negative electrode material including a silicon compound $SiO_x$, a first conductive layer, and a second conductive layer; where $0.5 \leq x \leq 1.5$; at least part of the first conductive layer is present between the silicon compound and the second conductive layer; and the first conductive layer includes carbon nanotubes, and the second conductive layer includes graphene.

For the negative electrode material described in this application, preferably, the first conductive layer substantially coats the silicon compound, and the second conductive layer substantially coats the first conductive layer.

For the negative electrode material described in this application, preferably, a median particle size A μm of the silicon compound and an average tube length B μm of the carbon nanotubes satisfy the following relational expression: $0.5*A \leq B \leq 2*\pi*A$. In this application, * means multiplication.

For the negative electrode material described in this application, preferably, a median particle size C μm of the negative electrode material and a median particle size A μm of the silicon compound satisfy the following relational expression: $A \leq C \leq 2A$.

For the negative electrode material described in this application, preferably, the median particle size A μm of the silicon compound and an average flake diameter D μm of the graphene satisfy the following relational expression:

$0.7*\pi*A^2 \le n*D^2 \le 1.5*\pi*A^2$, where n is the number of graphene flakes on surface of a single silicon compound particle, and $2 \le n \le 20$.

For the negative electrode material described in this application, preferably, the negative electrode material further includes an oxide $MeO_y$ layer, the oxide $MeO_y$ layer having at least one of the following characteristics:

(1) at least part of the oxide $MeO_y$ layer being present between the silicon compound and the first conductive layer;

(2) Me in the oxide $MeO_y$ layer including at least one of Al, Si, Ti, Mn, V, Cr, Co, or Zr, where $0.5 \le y \le 3$, and the oxide $MeO_y$ layer includes a carbon material; or (3) thickness of the oxide $MeO_y$ layer being 0.5 nm to 100 nm.

For the negative electrode material described in this application, preferably, the negative electrode material further includes a polymer layer, the polymer layer having at least one of the following characteristics:

(1) at least part of the polymer layer being present between the silicon compound and the second conductive layer, and preferably the polymer layer substantially coating the silicon compound;

(2) the polymer layer including one or more of polyvinylidene fluoride and derivatives thereof, carboxymethyl cellulose and derivatives thereof, sodium carboxymethyl cellulose and derivatives thereof, polyvinylpyrrolidone and derivatives thereof, polyacrylic acid and derivatives thereof, polymerized styrene butadiene rubber, polyacrylamide, polyimide, or polyamideimide;

(3) based on a total weight of the negative electrode material, a percentage of the polymer layer being 0.05 wt % to 10 wt %; or (4) thickness of the polymer layer being 1 nm to 100 nm.

For the negative electrode material described in this application, preferably, the negative electrode material has at least one of the following characteristics:

(1) the silicon compound in the negative electrode material including SiO, $SiO_2$, or a combination thereof;

(2) the negative electrode material including nano Si grains, and a size of the nano Si grain being less than 100 nm;

(3) a median particle size of the silicon compound in the negative electrode material being 500 nm to 30 μm;

(4) a median particle size of the negative electrode material being 1 μm to 50 μm;

(5) the graphene in the negative electrode material including graphene oxide, reduced graphene oxide, or a combination thereof;

(6) the number of layers of the graphene in the negative electrode material being 1 to 15;

(7) an average flake diameter of the graphene in the negative electrode material being 2 μm to 20 μm;

(8) a diameter of the carbon nanotubes in the negative electrode material being 2 nm to 30 nm, and the carbon nanotubes having a length-diameter ratio of 50 to 30000; or (9) based on a total weight of the negative electrode material, a percentage of the graphene being 1 wt % to 20 wt %, and a percentage of the carbon nanotubes being 0.1 wt % to 10 wt %.

In view of this, this application further provides a negative electrode material including the foregoing negative electrode material and further including a carbon material, a binder, a conductive material, or any combination thereof. The negative electrode material has at least one of the following characteristics:

(1) the carbon material in the negative electrode material including artificial graphite, natural graphite, or a combination thereof, and preferably, the carbon material including meso-carbon microbeads, soft carbon, hard carbon, or any combination thereof;

(2) the binder in the negative electrode material including polyacrylate, polyacrylic acid, polyimide, polyamide, polyamideimide, polyvinylidene fluoride, styrene-butadiene rubber, sodium alginate, polyvinyl alcohol, polytetrafluoroethylene, polyacrylonitrile, sodium carboxymethyl cellulose, potassium carboxymethyl cellulose, sodium hydroxymethyl cellulose, potassium hydroxymethyl cellulose, or any combination thereof; or (3) the conductive material in the negative electrode material including carbon nanotubes, vapor grown carbon fibers, carbon nanofibers, conductive carbon black, acetylene black, ketjen black, conductive graphite, graphene, or any combination thereof.

In view of this, this application further provides a negative electrode plate including a current collector and the foregoing negative electrode material, where the negative electrode material is applied onto at least one surface of the current collector.

For the negative electrode material described in this application, preferably, the negative electrode plate has a thickness of 50 μm to 200 μm, a single-surface compacted density of 1.2 $g/cm^3$ to 2.0 $g/cm^3$, and a resistance of 0.001Ω to 1000Ω.

For the negative electrode plate described in this application, preferably, peeling strength between the negative electrode material and the current collector is greater than 10 N/m.

In view of this, this application further provides an electrochemical apparatus including a positive electrode plate, the foregoing negative electrode plate, a separator, and an electrolyte.

In view of this, this application further provides an electronic apparatus including the foregoing electrochemical apparatus.

Beneficial effects of this application are as follows: In the negative electrode material of this application, the silicon compound is stepwise coated with graphene and carbon nanotubes. This combines respective advantages of a two-dimensional long-range flake graphene conductive material and a one-dimensional long-range carbon nanotube conductive material, and is more conducive to improving cycling performance of a battery. In particular, the silicon compound is coated first with graphene and then with carbon nanotubes to form a layered structure, more conducive to suppressing swelling of silicon in the negative electrode plate during cycling of the battery, thus further reducing a full charge swelling rate of the battery. Moreover, the preparation method of the foregoing negative electrode material is simple and easy to use and can realize low-cost industrial preparation.

DETAILED DESCRIPTION

The following describes some embodiments of this application in detail. These embodiments are implemented based on technical solutions of this application, and detailed implementations and processes are given. However, the protection scope of this application is not limited to the following embodiments, and experimental methods with no specific conditions specified in the following embodiments are usually performed in accordance with general conditions.

In some embodiments, preferably, during preparation of negative electrode plate, a Cu foil is coated with a negative electrode material with a coating thickness of 50 μm to 200 μm and a single-surface compacted density of 1.2 g/cm$^3$ to 2.0 g/cm$^3$. When the coating thickness and the single-surface compacted density fall within the foregoing ranges, resistance of the negative electrode plate falls within a range of 0.001Ω to 1000Ω.

In some embodiments, preferably, the negative electrode material includes an oxide $MeO_y$ layer, at least part of the oxide $MeO_y$ layer being present between a silicon compound and a first conductive layer. Further preferably, Me in the oxide $MeO_y$ layer includes at least one of Al, Si, Ti, Mn, V, Cr, Co, or Zr, where $0.5 \le y \le 3$, and the oxide $MeO_y$ layer includes a carbon material.

In some embodiments, preferably, thickness of the oxide $MeO_y$ layer is 0.5 nm to 100 nm.

In some embodiments, preferably, a process for preparing an $AlO_y$ layer of the negative electrode material is as follows.

(1) $SiO_x$ powder, a porogenic agent, and an oxide precursor AlXn form a mixed solution with the presence of an organic solvent and deionized water;

the mixed solution is dried to obtain powder; and the powder is sintered for 0.5 h-24 h at 250° C.-900° C. to obtain silicon compound $SiO_x$ particles containing an oxide $AlO_y$ layer.

(2) The silicon compound $SiO_x$ particles containing the oxide $AlO_y$ layer, an organic solvent, and a carbon precursor are mixed to form a mixed solution;

the mixed solution is dried to obtain powder; and the powder is sintered for 0.5 h-24 h at 700° C.-1400° C. to obtain silicon compound $SiO_x$ particles containing an oxide $AlO_y$ layer (containing carbon).

The carbon precursor is a mixture of phenolic resin and hexamethylenetetramine, where a weight ratio of phenolic resin to hexamethylenetetramine is about 12:1-6:1.

A weight ratio of the $SiO_x$ particles to the carbon precursor is 5-20.

The organic solvent includes at least one of the following solvents: ethanol, methanol, n-hexane, N,N-dimethylformamide, pyrrolidone, acetone, toluene, isopropanol, or n-propyl alcohol; and a volume of the organic solvent is twice (mL/g) to 5 times (mL/g) a weight of the $SiO_x$ particles.

$0.5 < x < 1.5$, and $0.5 \le y \le 3$.

X includes at least one of methoxy, ethoxy, isopropoxy, or halogen.

n is 1, 2, 3, or 4.

The porogenic agent includes at least one of the following compounds: polyvinylpyrrolidone, polyethylene oxide-polypropylene oxide-polyethylene oxide triblock copolymer, hexadecyl trimethyl ammonium bromide, or octadecyl trimethyl ammonium bromide.

A mass ratio of the $SiO_x$ powder, the porogenic agent, the oxide precursor AlXn, and deionized water is 100:1-4:0.5-10:1.5-30.

I. Physical Properties and Performance Tests

1. Particle Size Test 0.02 g of sample powder was added into a 50 mL clean beaker, and 20 mL of deionized water was added into the breaker, with a few drops of surfactant (1%) added to make the powder completely dispersed in the water. Then, the powder was subjected to ultrasound for 5 minutes in a 120 W ultrasonic cleaning machine, and particle size distribution was tested with a MasterSizer 2000.

2. SEM Test

Scanning electron microscope characterization was recorded with a PhilipsXL-30 field emission scanning electron microscope. Testing was performed under the conditions of 10 kV and 10 mA.

3. Test for Length of Carbon Nanotubes 0.01 g of carbon nanotubes and 1 g of sodium dodecylbenzene sulfonate were taken and added to 100 g of deionized water for ultrasonic dispersion, and then 0.2 g of a resulting solution was taken and applied onto copper foil. A scanning electron microscope was used to observe and measure lengths of 100 carbon nanotubes, and an average value thereof was taken as an average tube length of carbon nanotubes.

4. Test for Average Flake Diameter of Graphene 0.01 g of graphene and 1 g of sodium dodecylbenzene sulfonate were taken and added to 100 g of deionized water for ultrasonic dispersion, and then 0.2 g of a resulting solution was taken and applied onto copper foil. A scanning electron microscope was used to observe and measure flake diameters of 100 graphene flakes, and an average value thereof was taken as an average flake diameter of graphene.

5. Test for Number of Layers of Graphene

An atomic force microscope was used to test graphene. Thickness of a single layer graphene is generally 0.4 nm-0.7 nm. The number of layers of graphene could be directly calculated using an AFM height curve.

6. Test for Number n of Graphene Flakes on Surface of Single Silicon Compound Particle Under a field of view of a scanning electron microscope, a single silicon compound particle with graphene present on surface was magnified to a suitable magnification (10000×-50000×) with the one and only intact silicon compound particle under the field of view. The number of graphene flakes present on the surface of the silicon compound particle under the field of view was counted, such counting was performed on 100 silicon compound particles, and the number of graphene flakes was recorded as N. The number n of graphene flakes on surface of a single silicon compound particle was N/100*2, that was, N/50.

7. Conductivity Test

A resistivity tester (Suzhou Jingge Electronics ST-2255A) was used. 5 g of powder sample was taken and pressed at a constant pressure of 5000 kg±2 kg for 15 s-25 s with an electronic pressing machine. The sample was then placed between the electrodes of the tester with a sample height of h (cm), a voltage of U, a current of I, and a resistance of R (KΩ). The area of the powder-pressed sheet was S=3.14 cm$^2$, and the electronic conductivity of the powder sample was calculated according to the formula $\delta = h/(S*R)/1000$ in S/m.

8. High-Temperature Cycling Test

At a test temperature of 45° C., a battery was charged to 4.4 V at a constant current of 0.7 C, constant-voltage charged to 0.025 C, left standing for 5 minutes, and then discharged to 3.0 V at 0.5 C. A capacity obtained in this cycle was an initial capacity. Then, a 0.7 C charge and 0.5 C discharge cycling test was performed. A ratio of the capacity of each cycle to the initial capacity was calculated to obtain a capacity degradation curve.

9. Test for Full-Charge Swelling Rate of Battery

Thickness of a fresh battery at half charge was measured by a spiral micrometer. After 400 cycles, the battery was fully charged, the thickness of the battery was measured again by the spiral micrometer, and compared with the initial thickness of the fresh battery at half charge to obtain a swelling rate of the fully-charged battery at that time.

10. Discharge Rate Test

At 25° C., a battery was discharged to 3.0 V at 0.2 C, left standing for 5 minutes, charged to 4.4 V at 0.5 C, constant-voltage charged to 0.05 C, and left standing for 5 minutes. The discharge rate was adjusted and discharge tests were conducted separately at 0.2 C, 0.5 C, 1 C, 1.5 C, and 2.0 C respectively to obtain discharge capacities. The capacity obtained at each rate was compared with the capacity obtained at 0.2 C to obtain a ratio. Rate performance of the battery was compared by comparing the ratios.

II. Specific Examples and Comparative Examples

Example 1-1

(I) Preparation of Negative Electrode Material

1. Commercial silicon oxide $SiO_x$ ($0.5<x<1.5$, and $D_v50=5$ μm), conductive material 1, polymer 1, and solvent deionized water were added into an MSK-SFM-10 vacuum stirrer in a specified ratio and stirred for 180 minutes to form a slurry. The stirrer had a revolution speed of 10 r/min-40 r/min and a rotation speed of 1000 r/min-1500 r/min.

2. The slurry obtained in step 1 was transferred to a spray drying granulator, and the slurry formed tiny fogdrops at a centrifugal atomizer of the spray drying granulator. A rotation speed of the centrifugal disk was 500 r/min-5000 r/min. Then, the tiny fogdrops were dried and cooled in the spray drying granulator to obtain powder. The spray drying granulator had an inlet temperature of 260° C. and an outlet temperature of 105° C.

3. The powder obtained in step 2, conductive material 2, polymer 2, and solvent deionized water were added into the MSK-SFM-10 vacuum stirrer in a specified ratio and stirred for 180 minutes to form a slurry. The stirrer had a revolution speed of 10 r/min-40 r/min and a rotation speed of 1000 r/min-1500 r/min.

4. The slurry obtained in step 3 was transferred to the spray drying granulator, and the slurry formed tiny fogdrops at the centrifugal atomizer of the spray drying granulator. A rotation speed of the centrifugal disk was 500 r/min-5000 r/min. Then, the tiny fogdrops were dried and cooled in the spray drying granulator to obtain powder (which was a negative electrode material). The spray drying granulator had an inlet temperature of 260° C. and an outlet temperature of 105° C.

In the foregoing steps, for composition and amount of the commercial silicon oxide $SiO_x$, conductive material 1, and conductive material 2, refer to Table 1.

For particle size and conductivity of the negative electrode material, refer to Table 1-1.

(II) Preparation of Negative Electrode Plate

The negative electrode material obtained in step (I), a conductive agent acetylene black, and polyacrylic acid (PAA) were fully stirred and mixed to uniformity at a weight ratio of 95:1.2:3.8 in deionized water, and a resulting mixture was applied onto two surfaces of a Cu foil, followed by drying, cold pressing, and slitting to obtain a negative electrode plate.

The negative electrode material was applied onto the Cu foil with a coating thickness of 100 μm and a single-surface compacted density of 1.76 g/cm$^3$ to 2.0 g/cm$^3$.

(III) Preparation of Electrolyte

Under a dry argon environment, propylene carbonate (PC), ethylene carbonate (EC), and diethyl carbonate (DEC) were mixed at a weight ratio of 1:1:1 to obtain a solvent solution, and lithium hexafluorophosphate ($LiPF_6$) were added and well mixed, where the concentration of $LiPF_6$ was 1.15 mol/L. Then, 12 wt % fluoroethylene carbonate (FEC) was added and well mixed to obtain an electrolyte.

(IV) Preparation of Lithium-Ion Battery

An active substance $LiCoO_2$, conductive carbon black, and a binder polyvinylidene fluoride (PVDF) were fully stirred and mixed to uniformity in an N-methylpyrrolidone solvent system at a weight ratio of 96.7:1.7:1.6, and then a resulting mixture was applied onto an Al foil, followed by drying and cold pressing to obtain a positive electrode plate. A PE porous polymer film was used as a separator. The positive electrode plate, the separator, and the negative electrode plate prepared in step (II) were stacked in sequence, so that the separator was sandwiched between the positive and negative electrode plates for separation, and winding was performed to obtain an electrode assembly. The electrode assembly was placed in an outer package, the electrolyte prepared in step (III) was injected, and packaging was performed, followed by processes such as formation, degassing, and trimming, to obtain a full battery.

For cycling performance and discharge rate of the obtained battery, refer to Table 1-2.

Example 1-2 and Example 1-3

For a difference from Example 1-1, refer to Table 1. For composition and amount of the commercial silicon oxide $SiO_x$, conductive material 1, and conductive material 2, refer to Table 1. For particle size and conductivity of the negative electrode material, refer to Table 1-1. For cycling performance and discharge rate of the obtained battery, refer to Table 1-2.

Comparative Example 1 and Comparative Example 2

For a difference from Example 1-1, refer to Table 1. For composition and amount of the commercial silicon oxide $SiO_x$, conductive material 1, and conductive material 2, refer to Table 1. For particle size and conductivity of the negative electrode material, refer to Table 1-1. For cycling performance and discharge rate of the obtained battery, refer to Table 1-2.

TABLE 1

| Sequence of addition of different conductive materials | | | | | | | | | | | | |
|---|---|---|---|---|---|---|---|---|---|---|---|---|
| Example | $SiO_x$ | Conductive material 1 | Conductive material 2 | Type of graphene | Amount of graphene added | Number of layers of graphene | Flake diameter of graphene (μm) | Amount of carbon nanotubes added | Polymer 1 | Amount of polymer 1 added | Polymer 2 | Amount of polymer 2 added |
| 1-1 | 100 g | Graphene | SWCNT | Graphene oxide | 5 g | 3 | 8 | 1 g | CMC | 1 g | CMC | 1 g |
| 1-2 | 100 g | SWCNT | Graphene | Graphene oxide | 5 g | 3 | 8 | 1 g | CMC | 1 g | CMC | 1 g |
| 1-3 | 100 g | Graphene + SWCNT | / | Graphene oxide | 5 g | 3 | 8 | 1 g | CMC | 2 g | / | / |
| Comparative example 1 | 100 g | Graphene | / | Graphene oxide | 5 g | 3 | 8 | / | CMC | 1 g | / | / |
| Comparative example 2 | 100 g | / | SWCNT | / | / | / | / | 1 g | / | / | CMC | 1 g |

TABLE 1-1

| Example | Median particle size $D_v50$ of $SiO_x$ (μm) | Median particle size $D_v50$ of negative electrode material (μm) | Conductivity of negative electrode material (S/cm) |
|---|---|---|---|
| 1-1 | 5.4 | 6.7 | 2.34 |
| 1-2 | 5.3 | 6.2 | 1.56 |
| 1-3 | 5.5 | 8.5 | 2.23 |
| Comparative example 1 | 5.6 | 5.8 | 1.03 |
| Comparative example 2 | 5.5 | 6.5 | 1.34 |

It can be learned from Table 1-1 that the silicon oxide particles coated with the conductive material have increased particle size, and the commercial silicon oxide in Example 1-1 to Example 1-3 is coated with two types of conductive materials. Therefore, the resulting electrode material has significantly improved conductivity as compared with Comparative example 1 and Comparative example 2 in which the commercial silicon oxide is coated with only one type of conductive material.

TABLE 1-2

| Example | Cycles when capacity decays to 80% | Full charge swelling rate of battery after 400 cycles | Discharge rate (discharge capacity at 2 C/discharge capacity at 0.2 C) |
|---|---|---|---|
| 1-1 | 457 | 8.5% | 82.5% |
| 1-2 | 462 | 9.4% | 83.2% |
| 1-3 | 425 | 10.3% | 82.2% |
| Comparative example 1 | 387 | 9.1% | 81.8% |
| Comparative example 2 | 394 | 9.9% | 82.4% |

Refer to Table 1-2. The comparisons between Examples 1-1 to 1-3 and Comparative examples 1 and 2 illustrate that the composite coating of graphene and carbon nanotubes on the silicon oxide particles is more conducive to improving the cycling performance of the battery; moreover, the silicon oxide particles are coated first with graphene and then with carbon nanotubes to form a layered structure, which is more conducive to suppressing swelling of silicon-containing particles in the negative electrode plate during cycling of the battery, thus further reducing a full charge swelling rate of the battery.

Example 2-1 to Example 2-4

For a difference from Example 1-1, refer to Table 2. For composition and amount of the commercial silicon oxide $SiO_x$, conductive material 1, conductive material 2, polymer 1, and polymer 2, refer to Table 2. For particle size and conductivity of the negative electrode material, refer to Table 2-1. For cycling performance and discharge rate of the obtained battery, refer to Table 2-2.

Comparative Example 3 to Comparative Example 6

For a difference from Example 1-1, refer to Table 2. For composition and amount of the commercial silicon oxide $SiO_x$, conductive material 1, conductive material 2, polymer 1, and polymer 2, refer to Table 2. For particle size and conductivity of the negative electrode material, refer to Table 2-1. For cycling performance and discharge rate of the obtained battery, refer to Table 2-2.

TABLE 2

| Amount of different conductive materials added | | | | | | | | | | | | |
|---|---|---|---|---|---|---|---|---|---|---|---|---|
| Example | $SiO_x$ | Conductive material 1 | Conductive material 2 | Type of graphene | Amount of graphene added | Number of layers of graphene | Flake diameter of graphene (μm) | Amount of carbon nanotubes added | Polymer 1 | Amount of polymer 1 added | Polymer 2 | Amount of polymer 2 added |
| 1-1 | 100 g | Graphene | SWCNT | Graphene oxide | 5 g | 3 | 8 | 1 g | CMC | 1 g | CMC | 1 g |
| 2-1 | 100 g | Graphene | SWCNT | Graphene oxide | 10 g | 3 | 8 | 1 g | CMC | 2 g | CMC | 1 g |
| 2-2 | 100 g | Graphene | SWCNT | Graphene oxide | 20 g | 3 | 8 | 1 g | CMC | 4 g | CMC | 1 g |
| 2-3 | 100 g | Graphene | SWCNT | Graphene oxide | 5 g | 3 | 8 | 0.5 g | CMC | 1 g | CMC | 0.5 g |
| 2-4 | 100 g | Graphene | SWCNT | Graphene oxide | 5 g | 3 | 8 | 5 g | CMC | 1 g | CMC | 5 g |
| Comparative example 3 | 100 g | Graphene | SWCNT | Graphene oxide | 1 g | 3 | 8 | 1 g | CMC | 0.2 g | CMC | 1 g |
| Comparative example 4 | 100 g | Graphene | SWCNT | Graphene oxide | 30 g | 3 | 8 | 1 g | CMC | 6 g | CMC | 1 g |
| Comparative example 5 | 100 g | Graphene | SWCNT | Graphene oxide | 5 g | 3 | 8 | 0.1 g | CMC | 1 g | CMC | 0.1 g |
| Comparative example 6 | 100 g | Graphene | SWCNT | Graphene oxide | 5 g | 3 | 8 | 10 g | CMC | 1 g | CMC | 10 g |

TABLE 2-1

| Example | Median particle size $D_v50$ of $SiO_x$ (μm) | Median particle size $D_v50$ of negative electrode material (μm) | Conductivity of negative electrode material (S/cm) |
|---|---|---|---|
| 1-1 | 5.4 | 6.7 | 2.34 |
| 2-1 | 5.4 | 7.1 | 3.57 |
| 2-2 | 5.2 | 7.8 | 5.82 |
| 2-3 | 5.5 | 6.3 | 1.86 |
| 2-4 | 5.3 | 8.9 | 6.23 |
| Comparative example 3 | 5.4 | 6.3 | 1.24 |
| Comparative example 4 | 5.6 | 9.2 | 6.02 |
| Comparative example 5 | 5.4 | 6.1 | 1.45 |
| Comparative example 6 | 5.5 | 10.6 | 6.46 |

It can be learned from Table 2-1 that increased amount of the conductive material applied on the silicon oxide particles causes agglomeration of particles, leading to increased particle size $D_v50$ of the negative electrode material; and the conductivity of the negative electrode material increases with the increasing of the coating amount of the conductive material. However, the increase rate of the conductivity of the negative electrode material decreases when the coating amount of the conductive material increases to a specified value.

TABLE 2-2

| Example | Cycles when capacity decays to 80% | Full charge swelling rate of battery after 400 cycles | Discharge rate (discharge capacity at 2 C/discharge capacity at 0.2 C) |
|---|---|---|---|
| 1-1 | 457 | 8.5% | 82.5% |
| 2-1 | 489 | 8.1% | 86.3% |
| 2-2 | 532 | 8.9% | 85.7% |
| 2-3 | 413 | 8.7% | 81.3% |
| 2-4 | 513 | 9.7% | 84.2% |
| Comparative example 3 | 385 | 9.1% | 77.2% |
| Comparative example 4 | 432 | 9.6% | 79.8% |
| Comparative example 5 | 398 | 8.6% | 80.8% |
| Comparative example 6 | 348 | 11.3% | 82.1% |

Refer to Table 2-2. The comparisons between Example 1-1, Examples 2-1 to 2-4, and Comparative examples 3 to 6 illustrate that increasing of the coating amount of graphene in the negative electrode material is conducive to improving the cycling performance and rate performance of the battery while suppressing swelling of the silicon-containing particles in the negative electrode plate and reducing the full charge swelling rate of the battery, however, excessive coating amount of graphene in the negative electrode material, especially when greater than 20 wt %, causes more electrolyte to be consumed and hinders migration of lithium ions, thus deteriorating the rate performance and cycling performance of the battery; and increasing of the coating amount of carbon nanotubes is conducive to improving the cycling performance and rate performance of the battery, however, excessive coating amount of carbon nanotubes in the negative electrode plate causes severe agglomeration of particles, thus leading to deterioration in full charge swelling rate of the battery.

Example 3-1 and Example 3-2

For a difference from Example 1-1, refer to Table 3. For composition and amount of the commercial silicon oxide $SiO_x$, conductive material 1, conductive material 2, polymer 1, and polymer 2, refer to Table 3. For particle size and conductivity of the negative electrode material, refer to Table 3-1. For cycling performance and discharge rate of the obtained battery, refer to Table 3-2.

Comparative Example 7

For a difference from Example 1-1, refer to Table 3. For composition and amount of the commercial silicon oxide $SiO_x$, conductive material 1, conductive material 2, polymer 1, and polymer 2, refer to Table 3. For particle size and conductivity of the negative electrode material, refer to Table 3-1. For cycling performance and discharge rate of the obtained battery, refer to Table 3-2.

TABLE 3

Different number of layers of graphene

| Example | $SiO_x$ | Conductive material 1 | Conductive material 2 | Type of graphene | Amount of graphene added | Number of layers of graphene | Flake diameter of graphene (μm) | Amount of carbon nanotubes added | Polymer 1 | Amount of polymer 1 added | Polymer 2 | Amount of polymer 2 added |
|---|---|---|---|---|---|---|---|---|---|---|---|---|
| 1-1 | 100 g | Graphene | SWCNT | Graphene oxide | 5 g | 3 | 8 | 1 g | CMC | 1 g | CMC | 1 g |
| 3-1 | 100 g | Graphene | SWCNT | Graphene oxide | 5 g | 8 | 8 | 1 g | CMC | 1 g | CMC | 1 g |
| 3-2 | 100 g | Graphene | SWCNT | Graphene oxide | 5 g | 15 | 8 | 1 g | CMC | 1 g | CMC | 1 g |
| Comparative example 7 | 100 g | Graphene | SWCNT | Graphene oxide | 5 g | 20 | 8 | 1 g | CMC | 1 g | CMC | 1 g |

TABLE 3-1

| Example | Median particle size $D_v50$ of $SiO_x$ (μm) | Median particle size $D_v50$ of negative electrode material (μm) | Conductivity of negative electrode material (S/cm) |
|---|---|---|---|
| 1-1 | 5.4 | 6.7 | 2.34 |
| 3-1 | 5.3 | 6.5 | 1.26 |
| 3-2 | 5.5 | 6.8 | 0.42 |
| Comparative example 7 | 5.6 | 6.9 | 0.13 |

Refer to Table 3-1. It can be learned from the comparisons between Example 1-1, Examples 3-1 and 3-2, and Comparative example 7 that the number of layers of graphene has no significant influence on the particle size of the negative electrode material; however, with the increasing number of layers of graphene, the conductivity of the negative electrode material decreases significantly.

TABLE 3-2

| Example | Cycles when capacity decays to 80% | Full charge swelling rate of battery after 400 cycles | Discharge rate (discharge capacity at 2 C/discharge capacity at 0.2 C) |
|---|---|---|---|
| 1-1 | 457 | 8.5% | 82.5% |
| 3-1 | 424 | 8.6% | 80.1% |
| 3-2 | 405 | 8.3% | 76.1% |
| Comparative example 7 | 351 | 8.1% | 68.2% |

Refer to Table 3-2. The comparisons between Example 1-1, Examples 3-1 and 3-2, and Comparative example 7 illustrate that with the increasing number of layers of graphene, the electrical conductivity of the battery decreases and the number of lithium ion transmission channels are reduced, thus leading to deterioration in cycling performance and rate performance of the battery; however, the number of layers of graphene has small influence on the full charge swelling rate of the battery.

Example 4-1 and Example 4-2

For a difference from Example 1-1, refer to Table 4. For composition and amount of the commercial silicon oxide $SiO_x$, conductive material 1, conductive material 2, polymer 1, and polymer 2, refer to Table 4. For particle size and conductivity of the negative electrode material, refer to Table 4-1. For cycling performance and discharge rate of the obtained battery, refer to Table 4-2.

Comparative Example 8 and Comparative Example 9

For a difference from Example 1-1, refer to Table 4. For composition and amount of the commercial silicon oxide $SiO_x$, conductive material 1, conductive material 2, polymer 1, and polymer 2, refer to Table 4. For particle size and conductivity of the negative electrode material, refer to Table 4-1. For cycling performance and discharge rate of the obtained battery, refer to Table 4-2.

TABLE 4

| Flake diameter of different types of graphene | | | | | | | | | | | | |
|---|---|---|---|---|---|---|---|---|---|---|---|---|
| Example | $SiO_x$ | Conductive material 1 | Conductive material 2 | Type of graphene | Amount of graphene added | Number of layers of graphene | Flake diameter of graphene (μm) | Amount of carbon nanotubes added | Polymer 1 | Amount of polymer 1 added | Polymer 2 | Amount of polymer 2 added |
| 1-1 | 100 g | Graphene | SWCNT | Graphene oxide | 5 g | 3 | 8 | 1 g | CMC | 1 g | CMC | 1 g |
| | | | | | | | | 1 g | CMC | 1 g | CMC | |
| 4-1 | 100 g | Graphene | SWCNT | Graphene oxide | 5 g | 3 | 3 | 1 g | CMC | 1 g | CMC | 1 g |
| 4-2 | 100 g | Graphene | SWCNT | Graphene oxide | 5 g | 3 | 18 | 1 g | CMC | 1 g | CMC | 1 g |
| Comparative example 8 | 100 g | Graphene | SWCNT | Graphene oxide | 5 g | 3 | 1 | 1 g | CMC | 1 g | CMC | 1 g |
| Comparative example 9 | 100 g | Graphene | SWCNT | Graphene oxide | 5 g | 3 | 25 | 1 g | CMC | 1 g | CMC | 1 g |

TABLE 4-1

| Example | Median particle size $D_v50$ of $SiO_x$ (μm) | Median particle size $D_v50$ of negative electrode material (μm) | Conductivity of negative electrode material (S/cm) |
|---|---|---|---|
| 1-1 | 5.4 | 6.7 | 2.34 |
| 4-1 | 5.3 | 6.3 | 2.47 |
| 4-2 | 5.5 | 7.9 | 2.25 |
| Comparative example 8 | 5.6 | 5.9 | 2.57 |
| Comparative example 9 | 5.3 | 8.8 | 2.43 |

Refer to Table 4-1. The magnitude of the flake diameter of graphene has small influence on the conductivity of the negative electrode material. However, it can be learned from the comparisons between Example 1-1, Examples 4-1 and 4-2, and Comparative examples 8 and 9 that increased flake diameter of graphene leads to more severe agglomeration of particles in the negative electrode material.

TABLE 4-2

| Example | Cycles when capacity decays to 80% | Full charge swelling rate of battery after 400 cycles | Discharge rate (discharge capacity at 2 C/discharge capacity at 0.2 C) |
|---|---|---|---|
| 1-1 | 457 | 8.5% | 82.5% |
| 4-1 | 435 | 9.2% | 84.7% |
| 4-2 | 481 | 8.7% | 80.2% |
| Comparative example 8 | 412 | 9.5% | 86.1% |
| Comparative example 9 | 381 | 9.8% | 76.3% |

Refer to Table 4-2. The comparisons between Example 1-1, Examples 4-1 and 4-2, and Comparative examples 8 and 9 illustrate that the increasing of the flake diameter of graphene is more conducive to the presence of silicon-containing particles inside the graphene layer in the electrode material, suppressing swelling of the silicon-containing particles therein, and thereby improving the cycling performance of the battery and reducing the full charge swelling rate of the battery, however, the rate performance of the battery deteriorates. When the flake diameter of graphene increases to a specified value, especially when greater than 20 μm, a dispersion degree of graphene decreases and graphene cannot provide effective surface modification for the silicon-containing particles in the electrode material, leading to deterioration in cycling performance and full charge swelling rate of the battery.

Example 5-1 to Example 5-4

For a difference from Example 1-1, refer to Table 5. For composition and amount of the commercial silicon oxide $SiO_x$, conductive material 1, conductive material 2, polymer 1, and polymer 2, refer to Table 5. For particle size and conductivity of the negative electrode material, refer to Table 5-1. For cycling performance and discharge rate of the obtained battery, refer to Table 5-2.

TABLE 5

| Different types of graphene and carbon nanotubes | | | | | | | | | | | | |
|---|---|---|---|---|---|---|---|---|---|---|---|---|
| Example | $SiO_x$ | Conductive material 1 | Conductive material 2 | Type of graphene | Amount of graphene added | Number of layers of graphene | Flake diameter of graphene (μm) | Amount of carbon nanotubes added | Polymer 1 | Amount of polymer 1 added | Polymer 2 | Amount of polymer 2 added |
| 1-1 | 100 g | Graphene | SWCNT | Graphene oxide | 5 g | 3 | 8 | 1 g | CMC | 1 g | CMC | 1 g |
| 5-1 | 100 g | Graphene | SWCNT | Reduced graphene oxide | 5 g | 3 | 8 | 1 g | CMC | 1 g | CMC | 1 g |
| 5-2 | 100 g | Graphene | SWCNT | Graphene oxide + reduced | 2.5 g + 2.5 g | 3 | 8 | 1 g | CMC | 1 g | CMC | 1 g |

TABLE 5-continued

Different types of graphene and carbon nanotubes

| Example | $SiO_x$ | Conductive material 1 | Conductive material 2 | Type of graphene | Amount of graphene added | Number of layers of graphene | Flake diameter of graphene (μm) | Amount of carbon nanotubes added | Polymer 1 | Amount of polymer 1 added | Polymer 2 | Amount of polymer 2 added |
|---|---|---|---|---|---|---|---|---|---|---|---|---|
| | | | | graphene oxide | | | | | | | | |
| 5-3 | 100 g | Graphene | MWCNT | Graphene oxide | 5 g | 3 | 8 | 1 g | CMC | 1 g | CMC | 1 g |
| 5-4 | 100 g | Graphene | SWCNT + MWCNT | Graphene oxide | 5 g | 3 | 8 | 0.5 g + 0.5 g | CMC | 1 g | CMC | 1 g |

TABLE 5-1

| Example | Median particle size $D_v50$ of $SiO_x$ (μm) | Median particle size $D_v50$ of negative electrode material (μm) | Conductivity of negative electrode material (S/cm) |
|---|---|---|---|
| 1-1 | 5.4 | 6.7 | 2.34 |
| 5-1 | 5.4 | 7.9 | 3.56 |
| 5-2 | 5.6 | 6.9 | 2.86 |
| 5-3 | 5.7 | 6.2 | 1.25 |
| 5-4 | 5.5 | 6.4 | 1.94 |

Refer to Table 5-1. The comparisons between Example 1-1 and Examples 5-1 to 5-4 illustrate that, compared with graphene oxide, reduced graphene oxide used for the negative electrode material has poor dispersion effect, leading to poor surface modification for the silicon oxide and severe agglomeration of particles, but the conductivity of the negative electrode material is increased; and compared with single-walled carbon nanotubes, multi-walled carbon nanotubes used for the negative electrode material can reduce agglomeration of particles on the surface of the negative electrode material, but the conductivity of the negative electrode material is reduced to some extent.

TABLE 5-2

| Example | Cycles when capacity decays to 80% | Full charge swelling rate of battery after 400 cycles | Discharge rate (discharge capacity at 2 C/discharge capacity at 0.2 C) |
|---|---|---|---|
| 1-1 | 457 | 8.5% | 82.5% |
| 5-1 | 411 | 8.7% | 80.1% |
| 5-2 | 432 | 8.7% | 81.5% |
| 5-3 | 421 | 8.2% | 82.8% |
| 5-4 | 442 | 8.4% | 83.2% |

Refer to Table 5-1 and Table 5-2. The comparisons between Example 1-1 and Examples 5-1 to 5-4 illustrate that, as compared with graphene oxide, the electrode material prepared using reduced graphene oxide has improved electrical conductivity, but ionic conductivity of the electrode material is reduced, leading to deterioration in cycling performance and rate performance of the battery; and as compared with single-walled carbon nanotubes, the electrode material prepared using multi-walled carbon nanotubes has reduced electrical conductivity, leading to deterioration in cycling performance of the battery to some extent.

Example 6-1

Preparation steps of this example was basically the same as those of example 1-1, with the difference lying in that the "commercial silicon oxide $SiO_x$ ($0.5<x<1.5$, and $D_v50=5$ μm)" in step (I)-1 was replaced with "silicon compound $SiO_x$ particles containing an oxide layer (containing carbon)", where a process for preparing finished silicon compound $SiO_x$ particles containing an oxide layer (containing carbon) was as follows.

(1) 100 g of commercial silicon oxide $SiO_x$ ($0.5<x<1.5$, and $D_v50=5$ μm), 2.2 g of a porogenic agent polyvinylpyrrolidone (PVP), and 0.5 g of an oxide precursor aluminum isopropoxide $[Al(C_3H_7O)_3]$ formed a mixed solution with the presence of 300 mL of an organic solvent ethanol and 1.5 g of deionized water;

the mixed solution was dried to obtain powder; and the powder was sintered for 0.5 h-24 h at 250° C.-900° C. to obtain silicon compound $SiO_x$ particles containing an oxide $AlO_y$ (y=3) layer.

(2) The silicon compound $SiO_x$ particles containing the oxide $AlO_y$ layer prepared in step (1), 300 mL of an organic solvent ethanol, and 10 g of a carbon precursor (obtained by mixing phenolic resin and a curing agent hexamethylenetetramine at a weight ratio of 9:1) were mixed to form a mixed solution;

the mixed solution was dried to obtain powder; and the powder was sintered for 0.5 h-24 h at 700° C.-1400° C. to obtain silicon compound $SiO_x$ particles containing an oxide layer (containing carbon).

For composition and amount of the commercial silicon oxide $SiO_x$, conductive material 1, conductive material 2, polymer 1, and polymer 2, refer to Table 6. For particle size and conductivity of the negative electrode material, and metal percentage and thickness of the $Al_2O_3$ layer, refer to Table 6-1. For cycling performance and discharge rate of the obtained battery, refer to Table 6-2.

TABLE 6

| Presence of metal oxide layer | | | | | | | | | | | | | |
|---|---|---|---|---|---|---|---|---|---|---|---|---|---|
| Example | $SiO_x$ | Presence of metal oxide layer and type | Conductive material 1 | Conductive material 2 | Type of graphene | Amount of graphene added | Number of layers of graphene | Flake diameter of graphene (μm) | Amount of carbon nanotubes added | Polymer 1 | Amount of polymer 1 added | Polymer 2 | Amount of polymer 2 added |
| 1-1 | 100 g | No | Graphene | SWCNT | Graphene oxide | 5 g | 3 | 8 | 1 g | CMC | 1 g | CMC | 1 g |
| 6-1 | 100 g | Yes/ $Al_2O_3$ | Graphene | SWCNT | Reduced graphene oxide | 5 g | 3 | 8 | 1 g | CMC | 1 g | CMC | 1 g |

TABLE 6-1

| Example | Median particle size $D_v50$ of $SiO_x$ (μm) | Median particle size $D_v50$ of negative electrode material (μm) | Conductivity of negative electrode material (S/cm) | Type of metal oxide/ percentage of metal/thickness |
|---|---|---|---|---|
| 1-1 | 5.4 | 6.7 | 2.34 | / |
| 6-1 | 5.3 | 6.9 | 2.26 | $Al_2O_3$/ 0.120%/3 nm |

Refer to Table 6-1. The comparison between Example 1-1 and Example 6-1 illustrates that the silicon oxide particles further coated with the metal oxide $Al_2O_3$ has small influence on the particle size and conductivity of the negative electrode material.

TABLE 6-2

| Example | Cycles when capacity decays to 80% | Full charge swelling rate of battery after 400 cycles | Discharge rate (discharge capacity at 2 C/discharge capacity at 0.2 C) |
|---|---|---|---|
| 1-1 | 457 | 8.5% | 82.5% |
| 6-1 | 597 | 8.7% | 87.1% |

Refer to Table 6-2. The comparison between Example 1-1 and Example 6-1 illustrates that the silicon oxide particles being coated first with the metal oxide $Al_2O_3$ and then with graphene and carbon nanotubes can further improve the cycling performance and rate performance of the battery.

Example 7-1 to Example 7-6

For a difference from Example 1-1, refer to Table 7. For composition and amount of the commercial silicon oxide $SiO_x$, conductive material 1, conductive material 2, polymer 1, and polymer 2, refer to Table 7. For particle size and conductivity of the negative electrode material, refer to Table 7-1. For cycling performance and discharge rate of the obtained battery, refer to Table 7-2.

Comparative Example 10 to Comparative Example 12

For a difference from Example 1-1, refer to Table 7. For composition and amount of the commercial silicon oxide $SiO_x$, conductive material 1, conductive material 2, polymer 1, and polymer 2, refer to Table 7. For particle size and conductivity of the negative electrode material, refer to Table 7-1. For cycling performance and discharge rate of the obtained battery, refer to Table 7-2.

TABLE 7

| Amounts and types of different polymers | | | | | | | | | | | | |
|---|---|---|---|---|---|---|---|---|---|---|---|---|
| Example | $SiO_x$ | Conductive material 1 | Conductive material 2 | Type of graphene | Amount of graphene added | Number of layers of graphene | Flake diameter of graphene (μm) | Amount of carbon nanotubes added | Polymer 1 | Amount of polymer 1 added | Polymer 2 | Amount of polymer 2 added |
| 1-1 | 100 g | Graphene | SWCNT | Graphene oxide | 5 g | 3 | 8 | 1 g | CMC | 1 g | CMC | 1 g |
| 7-1 | 100 g | Graphene | SWCNT | Graphene oxide | 5 g | 3 | 8 | 1 g | CMC | 0.5 g | CMC | 0.5 g |
| 7-2 | 100 g | Graphene | SWCNT | Graphene oxide | 5 g | 3 | 8 | 1 g | CMC | 2 g | CMC | 2 g |
| 7-3 | 100 g | Graphene | SWCNT | Graphene oxide | 5 g | 3 | 8 | 1 g | CMC | 5 g | CMC | 5 g |
| 7-4 | 100 g | Graphene | SWCNT | Graphene oxide | 5 g | 3 | 8 | 1 g | CMC | 1 g | PAA | 1 g |
| 7-5 | 100 g | Graphene | SWCNT | Graphene oxide | 5 g | 3 | 8 | 1 g | PAA | 1 g | CMC | 1 g |
| 7-6 | 100 g | Graphene | SWCNT | Graphene oxide | 5 g | 3 | 8 | 1 g | PAA | 1 g | PAA | 1 g |
| Comparative example 10 | 100 g | Graphene | SWCNT | Graphene oxide | 5 g | 3 | 8 | 1 g | CMC | 0.1 g | CMC | 0.1 g |
| Comparative example 11 | 100 g | Graphene | SWCNT | Graphene oxide | 5 g | 3 | 8 | 1 g | CMC | 10 g | CMC | 10 g |

TABLE 7-continued

| Amounts and types of different polymers | | | | | | | | | | | | |
|---|---|---|---|---|---|---|---|---|---|---|---|---|
| Example | $SiO_x$ | Conductive material 1 | Conductive material 2 | Type of graphene | Amount of graphene added | Number of layers of graphene | Flake diameter of graphene (μm) | Amount of carbon nanotubes added | Polymer 1 | Amount of polymer 1 added | Polymer 2 | Amount of polymer 2 added |
| Comparative example 12 | 100 g | Graphene | SWCNT | Graphene oxide | 5 g | 3 | 8 | / | / | / | / | / |

TABLE 7-1

| Example | Median particle size $D_v50$ of $SiO_x$ (μm) | Median particle size $D_v50$ of negative electrode material (μm) | Conductivity of negative electrode material (S/cm) |
|---|---|---|---|
| 1-1 | 5.4 | 6.7 | 2.34 |
| 7-1 | 5.5 | 7.0 | 3.16 |
| 7-2 | 5.4 | 6.5 | 1.97 |
| 7-3 | 5.6 | 6.6 | 1.05 |
| 7-4 | 5.5 | 6.6 | 2.44 |
| 7-5 | 5.5 | 6.7 | 2.25 |
| 7-6 | 5.8 | 6.8 | 2.52 |
| Comparative example 10 | 5.5 | 8.9 | 5.89 |
| Comparative example 11 | 5.6 | 8.3 | 0.48 |
| Comparative example 12 | 5.5 | 11.9 | 6.93 |

Refer to Table 7-1. The comparisons between Example 1-1, Examples 7-1 to 7-3, and Comparative examples 10 to 12 illustrate that the increasing amount of polymer in the negative electrode material is conducive to improving dispersion uniformity of graphene and carbon nanotubes in the negative electrode plate, but deteriorates the conductivity of the powder in the negative electrode plate. It can be learned from Table 7-1 that different dispersing agents (CMC/PAA) used in Example 1-1 and Examples 7-4 to 7-6 has small influence on dispersion of graphene and carbon nanotubes in the negative electrode plate.

TABLE 7-2

| Example | Cycles when capacity decays to 80% | Full charge swelling rate of battery after 400 cycles | Discharge rate (discharge capacity at 2 C/discharge capacity at 0.2 C) |
|---|---|---|---|
| 1-1 | 457 | 8.5% | 82.5% |
| 7-1 | 469 | 8.9% | 85.1% |
| 7-2 | 449 | 8.3% | 80.4% |
| 7-3 | 428 | 8.2% | 75.8% |
| 7-4 | 463 | 8.4% | 83.3% |
| 7-5 | 466 | 8.6% | 82.7% |
| 7-6 | 457 | 8.7% | 83.2% |
| Comparative example 10 | 321 | 9.8% | 73.5% |
| Comparative example 11 | 362 | 9.6% | 68.7% |
| Comparative example 12 | 215 | 11.5% | 59.7% |

Refer to Table 7-1 and Table 7-2. The comparisons between Example 1-1, Examples 7-1 to 7-3, and Comparative examples 10 to 12 illustrate that the increasing amount of polymer in the negative electrode material improves dispersion uniformity of graphene and carbon nanotubes in the negative electrode plate, alleviates agglomeration of particles, and reduces the swelling rate of the battery, but deteriorates the rate performance of the battery. Excessively low amount (<0.1 g) of polymer leads to decreased dispersion uniformity of graphene and carbon nanotubes and severe agglomeration of particles in the negative electrode plate, resulting in significant deterioration in cycling, swelling, and rate performance of the battery; and excessively high amount (>10 g) of polymer leads to deterioration in dispersion effect of graphene and carbon nanotubes in the negative electrode plate, resulting in significant deterioration in cycling, swelling, and rate performance of the battery. The comparisons between Example 1-1 and Examples 7-4 to 7-6 illustrate that polymers of different types have small influence on performance of the battery.

Certainly, there may be various other embodiments of this application, and persons skilled in the art can make various corresponding changes and modifications according to this application without departing from the spirit and essence of this application. However, all such corresponding changes and modifications shall fall within the protection scope of this application.

What is claimed is:

1. A negative electrode material, comprising a silicon compound $SiO_x$, a first conductive layer, and a second conductive layer;

wherein $0.5 \le x \le 1.5$; at least a part of the first conductive layer is disposed between the silicon compound and the second conductive layer; and wherein the first conductive layer comprises carbon nanotubes and the second conductive layer comprises graphene.

2. The negative electrode material according to claim 1, wherein a median particle size A μm of the silicon compound and an average tube length B μm of the carbon nanotubes satisfy the following relational expression: $0.5*A \le B \le 2*\pi*A$.

3. The negative electrode material according to claim 1, wherein a median particle size C μm of the negative electrode material and a median particle size A μm of the silicon compound satisfy the following relational expression: $A \le C \le 2A$.

4. The negative electrode material according to claim 1, wherein a median particle size A μm of the silicon compound and an average flake diameter D μm of the graphene satisfy the following relational expression: $0.7*\pi**A^2 \le n*D^2 \le 1.5*\pi*A^2$, wherein n is the number of graphene flakes on surface of a single silicon compound particle, and $2 \le n \le 20$.

5. The negative electrode material according to claim 1, further comprising an oxide $MeO_y$ layer, wherein the oxide $MeO_y$ layer being present between the silicon compound and the first conductive layer;

wherein Me in the oxide $MeO_y$ layer comprising at least one of Al, Si, Ti, Mn, V, Cr, Co, or Zr, wherein $0.5 \leq y \leq 3$, and the oxide $MeO_y$ layer comprises a carbon material.

6. The negative electrode material according to claim 5, wherein a thickness of the oxide $MeO_y$ layer being 0.5 nm to 100 nm.

7. The negative electrode material according to claim 1, further comprising a polymer layer, wherein at least a part of the polymer layer being disposed between the silicon compound and the second conductive layer.

8. The negative electrode material according to claim 7, wherein the polymer layer comprising at least one of polyvinylidene fluoride and derivatives thereof, carboxymethyl cellulose and derivatives thereof, sodium carboxymethyl cellulose and derivatives thereof, polyvinylpyrrolidone and derivatives thereof, polyacrylic acid and derivatives thereof, polymerized styrene butadiene rubber, polyacrylamide, polyimide, or polyamideimide.

9. The negative electrode material according to claim 7, wherein based on a total weight of the negative electrode material, a percentage of the polymer layer being 0.05 wt % to 10 wt %.

10. The negative electrode material according to claim 7, wherein a thickness of the polymer layer being 1 nm to 100 nm.

11. The negative electrode material according to claim 1, wherein the silicon compound in the negative electrode material comprising SiO, or a combination of SiO and $SiO_2$.

12. The negative electrode material according to claim 1, wherein the negative electrode material comprising nano Si grains, and a size of the nano Si grain being less than 100 nm.

13. The negative electrode material according to claim 1, wherein a median particle size of the silicon compound in the negative electrode material being 500 nm to 30 μm.

14. The negative electrode material according to claim 1, wherein a median particle size of the negative electrode material being 1 μm to 50 μm.

15. The negative electrode material according to claim 1, wherein a diameter of the carbon nanotubes in the negative electrode material being 2 nm to 30 nm, and the carbon nanotubes having a length to diameter ratio of 50 to 30000.

16. The negative electrode material according to claim 1, wherein based on a total weight of the negative electrode material, a percentage of the graphene being 1 wt % to 20 wt %, and a percentage of the carbon nanotubes being 0.1 wt % to 10 wt %.

17. A negative electrode plate, comprising a current collector and the negative electrode material according to claim 1, wherein the negative electrode material is applied onto at least one surface of the current collector, wherein the negative electrode plate has a thickness of 50 μm to 200 μm, a single-surface compacted density of 1.2 $g/cm^3$ to 2.0 $g/cm^3$, and a resistance of 0.001Ω to 1000Ω.

18. The negative electrode plate according to claim 17, wherein a peeling strength between the negative electrode material and the current collector is greater than 10 N/m.

19. An electrochemical apparatus, comprising:

a positive electrode plate;

the negative electrode plate according to claim 17;

a separator disposed between the positive electrode plate and the negative electrode plate; and an electrolyte.

* * * * *